March 1, 1932.  C. R. BUCHET  1,847,379
CONNECTER FOR NIPPLES
Filed March 13, 1928
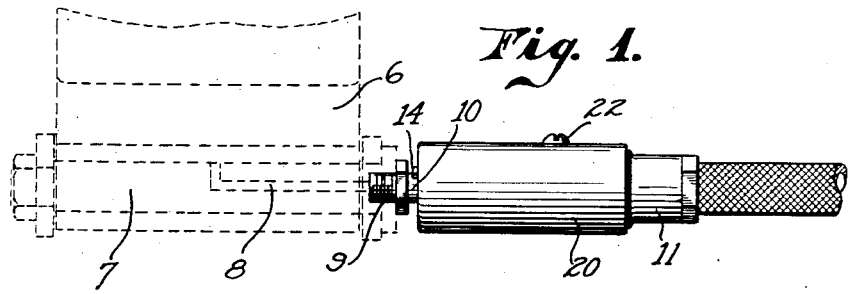
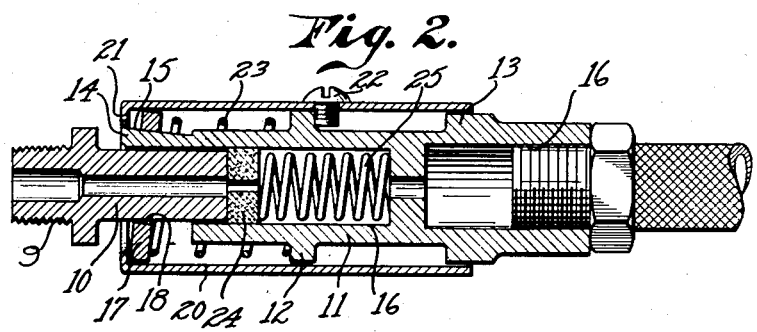
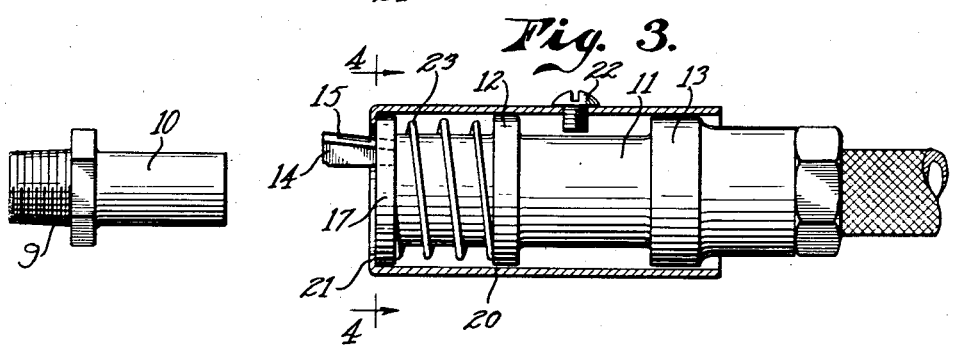
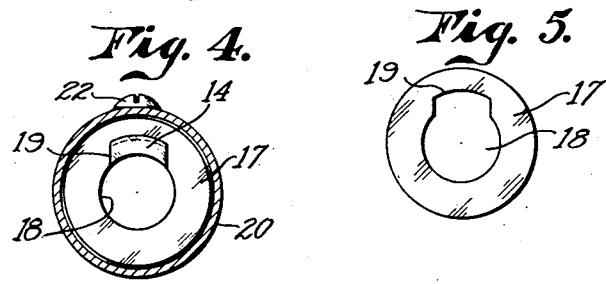
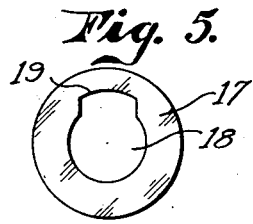
INVENTOR.
Conrad Robert Buchet;
BY
ATTORNEYS.

Patented Mar. 1, 1932

1,847,379

UNITED STATES PATENT OFFICE

CONRAD ROBERT BUCHET, OF LONG BEACH, CALIFORNIA, ASSIGNOR, BY MESNE ASSIGNMENTS, TO ALEMITE CORPORATION, OF CHICAGO, ILLINOIS, A CORPORATION OF DELAWARE

CONNECTER FOR NIPPLES

Application filed March 13, 1928. Serial No. 261,211.

This invention relates to a connecter for nipples and is adaptable for coupling a nipple thereto and holding it in such position. A particular field of use is in lubricating systems, although it is in no manner limited to such use. However, the embodiment of the invention illustrated herein is described as forming elements of such a system. In a lubricating system, a plain nipple for the introduction of lubricant is desirable together with slip-on connection for the nipple and connecter so arranged that the connecter and nipple when joined are sealed and compression may be resorted to for forcing lubricant through the nipple. It is also desirable to provide such a system with means for retaining the nipple and connecter coupled, which means is easily releasable.

The objects of this invention are first, to provide a connecter which, when slipped upon a nipple, will grab the same without further operation, and retain the coupling against pressure, the grip increasing in magnitude with increase of the separation effort; second, to provide a connecter which requires no additional coupling elements on the nipple; third, to provide a connecter which is easily released from the nipple; and fourth, to provide details of structure contributing to simplicity, durability, strength and compactness of construction, economy of manufacture, and ease of manipulation.

Other objects and advantages will be made fully apparent from the following specification considered in connection with the accompanying drawings, in which:—

Fig. 1 is a side elevation of the connecter and a nipple gripped thereby shown in full lines, a fragment of a structure lubricated being shown in dotted lines; Fig. 2 is an axial section through the connecter and the nipple; Fig. 3 is an axial section through the connecter cage showing the remaining elements in elevation and a nipple separated therefrom; Fig. 4 is a section as seen on the line 4—4 of Fig. 3; and Fig. 5 is an elevation of the grab ring.

Referring with more particularity to the drawings, 6 indicates a fragment of an automobile having a bolt 7 provided with a lubricant passage 8. The end of the bolt has mounted therein a nipple 9. The nipple is provided with a cylindrical end 10 to receive the connecter. It will be noted that the nipple has a plain surface and that no additional coupling elements are provided thereon.

The connecter comprises a barrel 11 having an annular rib 12 which provides a shoulder for a spring on one side and an abutment for a limiting member on the other side. An enlargement 13 providing a shoulder on the barrel for the limiting member is also provided. Extending beyond the mouth of the barrel is a bracket member 14 having an inclined upper surface 15 flaring outwardly away from the axis of the barrel. A counterbore 16 is formed in the barrel to receive the nipple and cause sealing thereto. The other end of the barrel is counterbored as indicated by 16 and internally threaded to receive a hose coupling through which the lubricant may be passed under pressure. Hung upon the bracket member 14 is a grab ring 17 having a hole 18 extending therethrough of a slightly larger diameter than the external diameter of the nipple. A peripheral recess 19 is formed in the ring at the hole so that the ring may be hung upon the bracket member with the hole 18 in registration with the bore of the barrel and will not turn thereon. The construction is such that in accordance with the position of the ring upon the bracket member, the marginal edge of the hole 18 opposite to the recess 19 will be positioned correspondingly in transverse position with relation to the bore of the barrel. It is also obvious that by shifting or canting the ring or both, the location of the marginal edge will be changed. Slidably disposed over the barrel is a cage or shell 20 having an inturned flange 21 for engagement by the grab ring. A limiting pin in the form of a set screw 22 is provided to limit the positions of the cage upon the barrel. A compression spring 23 is disposed between the rib 12 and the grab ring tending to hold the ring against the flange 21 and to maintain the cage in the position shown in Fig. 2. Within the bore of the barrel is a sealing washer 24 with a compression spring 25 back of it.

The connecter is slipped over the nipple, the cylindrical portion 10 entering and moving the yoke 17 inwardly until the hole 18 therein is alined with the bore 16 of the barrel to permit entrance of the nipple into the barrel so that it seats against the sealing washer 24. The spring 25 tends to force the nipple outwardly, and causes the grab to shift outwardly and swing into the position shown in Fig. 2. The spring 23 tends to maintain the grab in outer position, thereby firmly gripping the nipple and holding it in position. Outward pull on the nipple tends to cant the ring and increase the grip. To release the nipple, the shell 20 is shifted so as to retract it upon the barrel causing the grab to be shifted into releasing position downwardly on the incline 15 thereby releasing the nipple, which may then be withdrawn.

What I claim is:—

1. A connecter for high pressure lubricating apparatus adapted to be coupled to a nipple comprising a barrel, a cage shiftable thereon, a grab disposed to engage a nipple and movable outwardly toward grabbing position and inwardly toward releasing position, resilient means tending to move said cage and grab outwardly into grabbing position, said cage being shiftable inwardly to move said grab toward releasing position, and resilient means in said barrel normally resisting penetration of a nipple.

2. A connecter adapted to be coupled to a nipple comprising a barrel having a bore for communicating with the bore of a nipple, a bracket member rigidly disposed with relation to said barrel, a grab for grabbing a nipple supported upon said bracket member so as to have a nipple engaging surface shiftable transversely to grab said nipple to hold the latter against retraction from coupled position or vice-versa, and a cage around said connecter to shift said grab from grabbing to releasing positive or vice-versa.

3. A connecter adapted to be coupled to a nipple comprising a barrel having a bore for communication with the bore of a nipple, a bracket member extending in alignment with said barrel, a grab yoke for grabbing a nipple slidably hung on said bracket so as to have a nipple engaging surface shiftable transversely and to grab a nipple to hold the latter against retraction from coupled position.

4. A connecter adapted to be coupled to a nipple comprising a barrel having a bore for communication with the bore of a nipple, a bracket member extending in alignment with said barrel, a grab for grabbing a nipple slidably hung on said bracket so as to have a nipple engaging surface shiftable transversely to grab a nipple to hold the latter against retraction from coupled position, and means to shift said grab from grabbing to releasing position or vice-versa.

5. A connecter adapted to be coupled to a nipple comprising a barrel having a bore for communication with the bore of a nipple, a bracket member rigidly disposed with relation to said barrel and having a surface flaring outwardly away from the axis of said barrel, a grab hung on said bracket member in engagement with said surface so as to be shifted thereon to grabbing position with a nipple or releasing position.

6. A connecter adapted to be coupled to a nipple comprising a barrel having a bore for communication with the bore of a nipple, a bracket member rigidly disposed with relation to said barrel and having a surface flaring outwardly away from the axis of said barrel, a grab hung on said bracket member in engagement with said surface so as to be moved outwardly thereon to grabbing position with a nipple or inwardly thereon to releasing position, and means to move said grab from grabbing to releasing position or vice-versa.

7. A nipple connecter adapted to be coupled to a nipple comprising a barrel having a bore for communication with the bore of a nipple, a bracket member rigidly disposed in relation to said barrel, a grab for engaging a nipple slidably supported upon said bracket member so as to be shifted longitudinally and canted whereby to hold a nipple against retraction from coupled position, means tending to shift said grab forward to hold a nipple, and manually operable means shiftable on said barrel to move said grab to releasing position.

8. A nipple connecter adapted to be coupled to a nipple comprising a barrel having a bore for communication with the bore of a nipple, a bracket member extending in alignment with said barrel, a grab for engaging a nipple slidably supported on said bracket so as to be shiftable to grab a nipple and to hold the latter against retraction from coupled position, resilient means tending to shift said grab, manually operable means shiftable on said barrel to move said grab to releasing position, and spring-pressed sealing means within the bore of said barrel engageable with the end of said nipple when the latter is coupled to said barrel.

9. A nipple connecter adapted to be coupled to a nipple comprising a barrel having a bore for communication with the bore of a nipple, a bracket member rigidly disposed with relation to said barrel and having a surface flaring outwardly away from the axis of said barrel, a grab hung on said bracket member in engagement with said surface so as to be swung and moved thereon to grabbing position with a nipple or to a releasing position, means tending to move said grab outwardly, means shiftable on said barrel to move said grab to releasing position, and spring-pressed sealing means within the bore of said barrel engageable with the end of said nipple and exerting a force in a direction tending to uncouple said barrel and nipple when said parts are in coupled relation.

10. A connecter adapted to be coupled to a nipple comprising a barrel having a bore for communication with the bore of a nipple, a bracket member rigidly disposed with relation to said barrel, a grab for grabbing a nipple supported upon said bracket member so as to be shifted to grab a nipple to hold the latter against retraction from coupled position, resilient means tending to shift said grab, and a cage shiftable longitudinally with relation to said barrel to move said grab to releasing position.

11. A connecter adapted to be coupled to a nipple comprising a barrel having a bore for communication with the bore of a nipple, a bracket member rigidly disposed with relation to said barrel and having a surface flaring outwardly away from the axis of said barrel, a grab hung on said bracket member in engagement with said surface so as to be shifted thereon to grabbing position with a nipple or releasing position, resilient means tending to move said grab outwardly to grabbing position, and a cage shiftable longitudinally with relation to said barrel to move said grab to releasing position.

12. A connecter adapted to be connected to a nipple comprising a barrel having a bore to slidably receive a nipple, means for sealing the nipple bore to the bore of said barrel, a cage shiftable longitudinally on said barrel, a bracket member rigidly supported with relation to said barrel, a grab ring for embracing the nipple supported on said bracket so as to be shifted thereon to grabbing or releasing position, and means tending to shift said ring engaged with said cage so as to be movable thereby into releasing position.

13. A connecter adapted to be connected to a nipple comprising a barrel having a bore to slidably receive a nipple, means for sealing the nipple bore to the bore of said barrel, a cage shiftable longitudinally on said barrel, a bracket member overhanging the end of said barrel having a surface flaring outwardly away from said barrel, a grab ring for embracing a nipple hung on said bracket member so as to be shifted thereon, and means tending to shift said ring into grabbing position and operable by said cage to swing said ring into releasing position.

14. A connecter adapted to be connected to a nipple comprising a barrel having a bore to slidably receive a nipple, a sealing washer in the bore of said barrel, resilient means tending to force said washer outwardly, a bracket member overhanging the end of said barrel having a surface flaring outwardly away from said barrel, a grab ring for embracing a nipple hung on said bracket member so as to be shifted thereon, spring means encircling said barrel and engaging said ring tending to move the latter outwardly to grabbing position, and a cage shiftable longitudinally on said barrel and operable to move said ring into releasing position.

15. A coupling device for making a quick detachable connection with a lubricant receiving fitting which has a substantially smooth cylindrical projection, comprising a body having a bore adapted to receive the projecting portion of the fitting, sealing means in said bore, a spring for urging said sealing means outwardly, a washer slidably engageable with said body and adapted to contact with the cylindrical surface of a fitting and clamp the latter against retraction from said body, a spring engageable with said washer to force it into clamping position, and a cage surrounding said washer and spring and axially slidable relative to said body, whereby said washer may be withdrawn from clamping position.

16. In high pressure lubricating apparatus of the class described, the combination of a lubricant receiving fitting having a substantially smooth cylindrical projection with a lubricant passageway therethrough, a connecter body having a bore adapted to receive the projection of said fitting, spring pressed sealing means engageable with the end of said fitting and the walls of the bore in said body, an outwardly flaring projection on the end of said body, a washer slidable on said projection and tiltable relative thereto, said washer having an opening to receive the cylindrical portion of said fitting and upon tilting movement to hold said fitting against retraction from said body, resilient means for urging said washer toward clamping position, and manually engageable means for moving said washer against the pressure of said last named means.

In witness that I claim the foregoing I have hereunto subscribed my name this 1st day of March, 1928.

CONRAD ROBERT BUCHET.